June 17, 1924.
R. B. KINGMAN
SCOURING DEVICE
Filed July 10, 1923
1,498,385
3 Sheets-Sheet 2
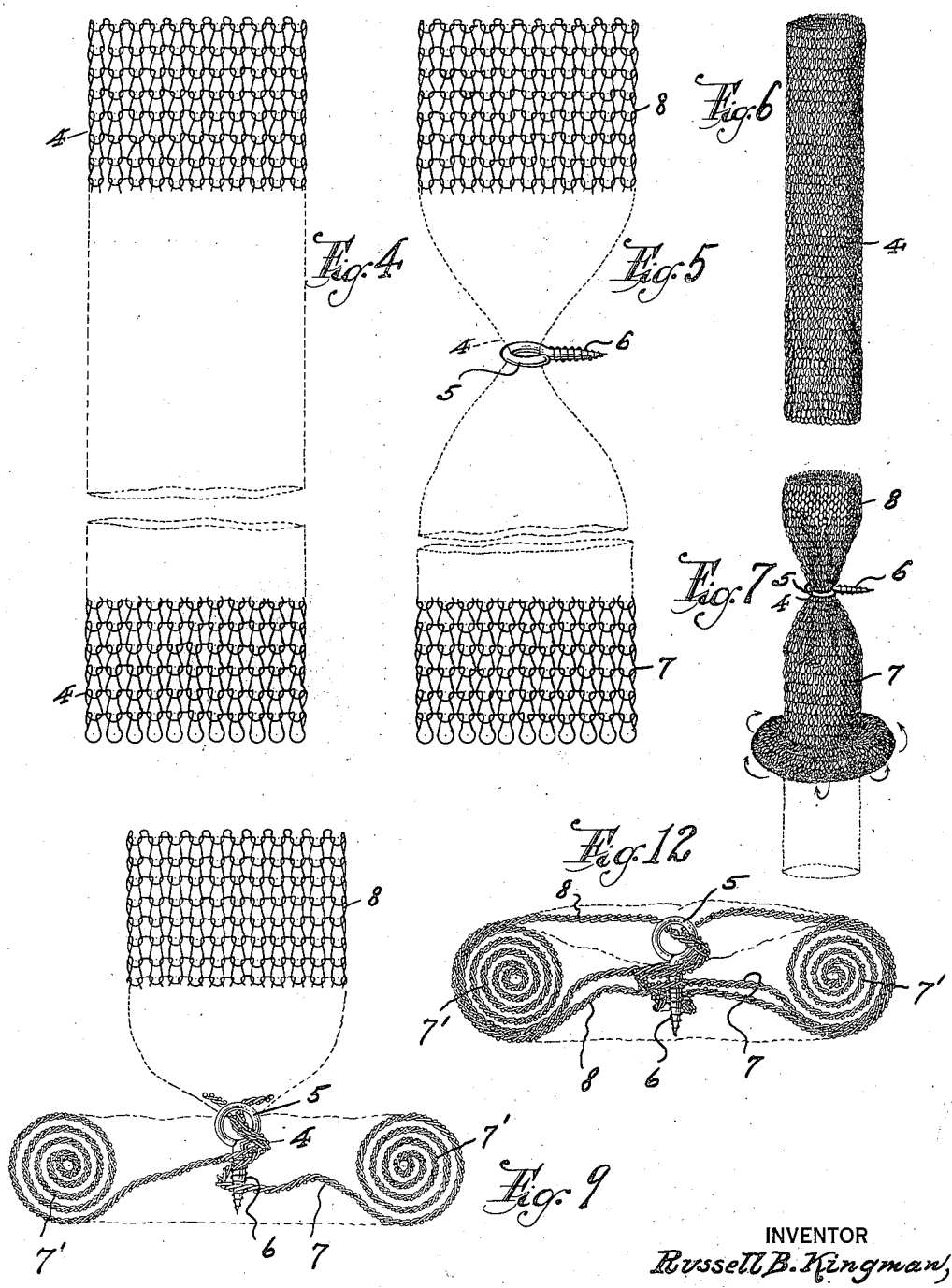
INVENTOR
Russell B. Kingman,
BY
Frantzel and Richards
ATTORNEYS

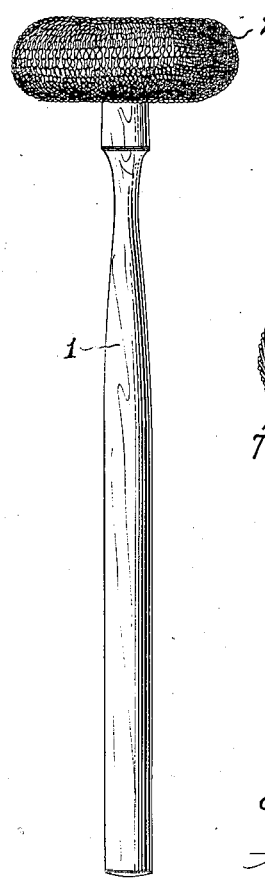
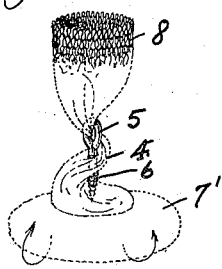
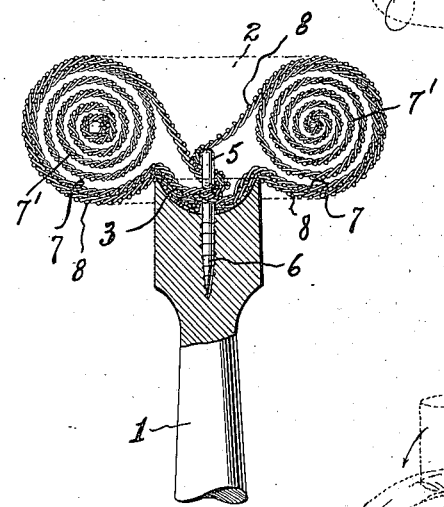
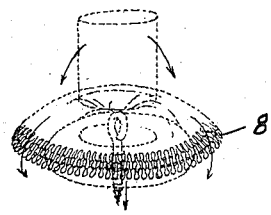
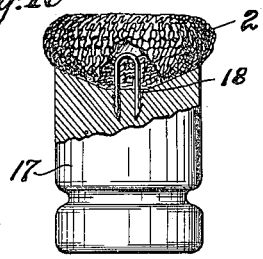
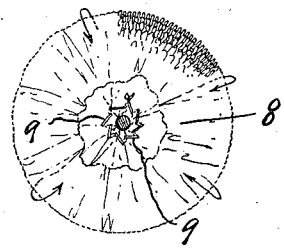
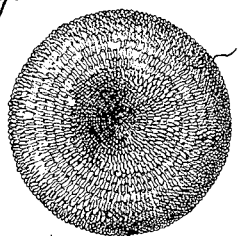

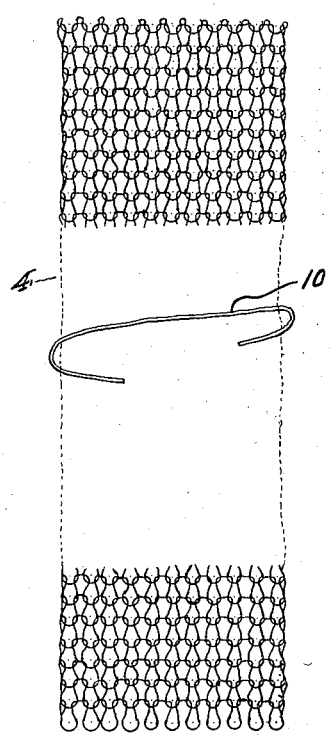
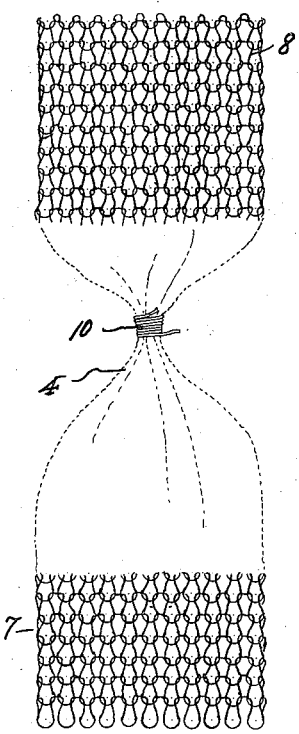
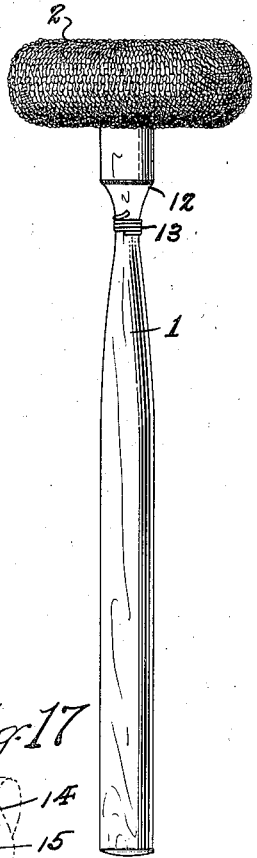
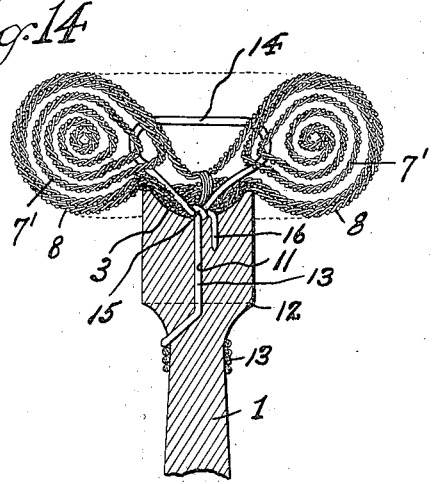
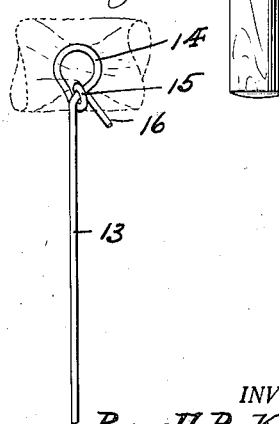

Patented June 17, 1924.

1,498,385

UNITED STATES PATENT OFFICE.

RUSSELL B. KINGMAN, OF ORANGE, NEW JERSEY.

SCOURING DEVICE.

Application filed July 10, 1923. Serial No. 650,606.

*To all whom it may concern:*

Be it known that I, RUSSELL B. KINGMAN, a citizen of the United States, residing at Orange, in the county of Essex and State of New Jersey, have invented certain new and useful Improvements in Scouring Devices; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

This invention relates, generally, to an improved kitchen utensil or scouring implement; and the invention has reference, more particularly, to an improved construction of dish and pot mop, bottle scourer or similar utensil.

The invention has for its principal object to provide an article of the kind above mentioned, which consists of a novel construction and arrangement of mop head secured in fixed attached relation to the end of a handle or stick; the provision of novel means for so securing the same to the handle or stick being a further object of this invention.

Other objects of this invention, not at this time more particularly enumerated, will be clearly understood from the following detailed description of the same.

With the various objects of this invention in view, the same consists, primarily, in the novel construction of dish and pot mop or the like, hereinafter set forth; and the invention consists, furthermore, in the novel arrangements and combinations of the several devices and parts, as well as in the details of the construction of the same, all of which will be more fully described in the following specification, and then finally embodied in the claims appended thereto.

The invention is clearly illustrated in the accompanying drawings, in which :—

Figure 1 is a side elevation of the novel dish and pot mop made according to and embodying the principles of this invention; Figure 2 is a top end elevation of the same; and Figure 3 is a vertical longitudinal section of the same, drawn on an enlarged scale.

Figure 4 is a diagrammatic face view of a tubular fabric from which the mop head is made; Figure 5 is a similar diagrammatic face view showing the first step in applying a fastening means thereto which serves to attach the finished mop head to a handle or stick; Figure 6 is a perspective view similar to Figure 4; Figure 7 is a perspective view similar to Figure 5, but also illustrating the first step in forming the mop head; Figure 8 is a perspective view illustrating a further step in producing the mop head; Figure 9 is a vertical section of the structure developed in the making to the condition shown in Figure 8, said view being drawn on an enlarged scale; Figure 10 is a perspective view illustrating the manner of finishing the mop head structure; Figure 11 is a bottom view of the finished mop head structure; and Figure 12 is a vertical longitudinal section of the finished mop head structure ready for attachment to a handle or stick, said view being drawn on an enlarged scale.

Figure 13 is a side elevation of the novel mop showing a modified construction and arrangement of fastening means for attaching the same to the handle or stick; Figure 14 is a vertical longitudinal section of the same, drawn on an enlarged scale; Figures 15 and 16 are diagrammatic views showing the initial preparation of the tubular fabric for the ultimate formation of the mop-head adapted for combination with said modified fastening means; and Figure 17 is a diagrammatic view showing the fastening means drawn into operative attached and embracing relation to said mop-head.

Fig. 18 shows another modified form of cleaning or scouring element.

Similar characters of reference are employed in all of the hereinabove described views, to indicate corresponding parts.

Referring now more especially to Figures 1 to 12 inclusive of said drawings, the reference character 1 indicates a handle or stick, upon the upper end of which is secured the novel construction of mop head 2 made according to and embodying the principles of this invention. Said handle or stick is preferably provided at its upper end with a seat depression or socket 3, the walls of which converge from the open mouth thereof inwardly and downwardly to the bottom thereof.

The novel mop head is constructed from a tubular knit fabric. This fabric may be all metal, that is one which is knit from a thin ribbon-like metallic wire, preferably of non-corrosive character, such e. g. as copper; or the fabric may be made of tubular knit yarn, or mixed tubular knit yarn and metal to provide a composite material. Specifically, however, I desire to claim, and believe to be new a mop head of this kind which is constructed entirely of metal and provided with means for firmly attaching the same to a handle or stick. Such all metal mop head, with its convenient handle or stick for manipulating the same, affords a most excellent scouring implement, for scouring and cleansing the inside of small mouthed vessels and utensils of various kinds, and one which provides for a very effective abrading action which quickly and easily removes caked or hardened dirt crusts and the like from all kinds of vessels and utensils.

In making up the novel form of mop head, I take a suitable length 4 of tubular knit fabric, such as shown in Figures 4 and 6, and I then thread the same through the eye-portion 5 of a screw eye having screw-threaded shank 6, so that the major portion 7 of the tubular fabric body 4 is below the eye-portion 5, while a comparatively short section 8 projects above the eye-portion 5. The next step in the formation of the mop head consists in rolling outwardly and upwardly upon itself the major length 7 of the tubular fabric in the manner illustrated in Figure 7, whereupon the fabric is twisted laterally so that the shank 6 of the screw-eye may be thrust downwardly through the body of the fabric in a central position intermediate the convolutions 7' thus formed, in the manner illustrated in Figures 8 and 9. These operations so dispose the shank 6 of the screw-eye, that the same projects downwardly or depends from the center of the rolled fabric mass. The mop head is then finished by turning downwardly and outwardly over and around the rolled mass of the fabric the upper short section 8 which thus forms an outer enveloping skirt or cover section, all as illustrated in Figures 10, 11 and 12 of the drawings. The free edge of the cover or skirt thus formed by the turned section 8 of the fabric is gathered about the depending shank 6 of the screw eye, and is thereupon secured in such operative position, by stitching the same to the rolled mass of the fabric by wire or other stitches 9 (see Figure 11), or any other suitable form or arrangement of fastening means may be provided. As a result of the above-described operations there is formed a novel more or less resilient spongiform mass providing a novel mop head, which not only provides (especially when an all metal fabric is used) a scouring implement adapted to furnish a very efficient abrasive action, but also one which is coarsely porous so that cleansing water readily plays therethrough, and also one which may in itself be thoroughly cleaned after use, and therefore easily maintained in sanitary condition.

Having completed the formation of the mop head in the manner above described, the same is ready for attachment to the handle or stick 1. This is accomplished by inserting the shank 6 of the screw-eye into the seating depression or socket 3 of the handle or stick so that the point thereof will enter the body of the handle or stick centrally at the bottom of said seating depression or socket 3. The screw-eye is then screwed home into the body of the handle or stick so as to draw the central portion of the mop head down into the seating depression or socket 3, as shown in Figure 3, thus firmly and securely attaching or coupling the novel mop head to the end of the handle or stick to complete the novel scouring implement as illustrated in Figure 1.

Referring now to Figures 13 to 16 inclusive, I have illustrated therein a novel dish and pot mop embodying the principles of this invention, but involving the use of a somewhat modified means of fastening or coupling the novel mop-head 2 to the handle or stick 1. In this modified structure, instead of gathering the tubular fabric 4 through the eye portion of a screw eye, a cord, wire or other flexible tie 10 is employed to gather the body of the fabric together so as to divide the length of the same into the lower major portion 7 and the comparatively short upper section 8, as illustrated in Figures 15 and 16. This having been done, the formation of the mop-head is proceeded with in substantially the same manner as already above described, that is, the lower portion is rolled outwardly and upwardly upon itself to form the convoluted mass, and the short section 8 is then turned outwardly and downwardly around the convoluted mass, and then the free edge of the same is suitably secured at the under side to the body of the mass. The stick 1 is provided at its upper end with the seating depression or socket 3. Leading downwardly from the bottom of the seating depression or socket 3 is a wire passage 11 which extends outwardly to the exterior surface of the handle or stick 1 at a point beneath the shoulder 12 formed by the enlarged end of the stick. The reference character 13 indicates an anchor wire having a loop or slip-noose portion 14, the slip-knot end 15 of which terminates in a downwardly projecting spur 16 if desired. Before entering the free or running end of the anchor-wire 13 through the slip-knot end 15, the same is caused to penetrate upwardly, over the outer face and again downwardly through the formed body of the mop head, as shown in Figure 14, being then threaded through the slip-knot 15 which is positioned centrally beneath the body of the mop head. Such assembling of the parts having been completed, the free or running end of the anchor-wire 13 is passed downwardly through the wire passage 11 to project exteriorly from the side of the handle or stick 1. The wire 13 is now drawn tight, thereby contracting the noose formed through the body of the mop head (as indicated in Figure 17), and at the same time pulling the body of the latter downwardly into the seating depression or socket 3. If the spur 16 is provided the above operation will also cause the same to penetrate the body of the handle or stick 1 (as shown in Figure 14) thus retaining the mop-head against turning or twisting in the said seating depression or seat 3. When the anchor-wire 13 is thus drawn taut, and the mop-head is firmly seated relative to the seating depression or socket 3, the outwardly projecting free end of the wire is wrapped exteriorly around the handle or stick, below the shoulder 12, and suitably secured against displacement from such wrapped relation. In this way the anchor-wire 13 is secured against withdrawal outwardly from the socketed end of the handle or stick, while at the same time the slip-noose is firmly held in operative embracing relation to the mop-head, so that the latter is thus firmly coupled in attached relation to the end of the handle or stick, and the completed device is thereupon ready for use.

Referring now to Figure 18, I have there shown a modified form of my device, the head 2 being constructed in the manner above described, but of smaller size, and then secured to a handle device or grip 17, by means of a staple 18 driven through the center of the head and then into the end of the handle device or grip, thus providing a very compact and cheap device.

I am aware that some changes may be made in the various arrangements and combinations of the devices and parts, as well as in the details of the construction of the same, without departing from the scope of this invention as set forth in the foregoing specification, and as defined in the appended claims. Hence, I do not limit my invention to the exact arrangements and combinations of the various devices and parts as described in the said specification, nor do I confine myself to the exact details of the construction of said parts as illustrated in the accompanying drawings.

I claim:—

1. A scouring implement, comprising a mop head, said mop head consisting of a tubular knit fabric having means gathering its body to form a restricted intermediate portion dividing the same into a lower major portion and an upper short section, said major portion being turned outwardly and rolled upwardly upon itself to form a convoluted spongiform main body, said upper section being turned downwardly and around said main body to envelope the same, with its free edge secured to said main body; a handle stick, and means for securing said mop head to an end of said handle stick.

2. A scouring implement, comprising a mop head formed from a tubular knit fabric, a fastening means comprising an eye-member having a projecting screw threaded shank, said tubular knit fabric being inserted lengthwise through said eye-member to divide the former into a lower major portion and an upper short section, said major portion being turned outwardly and rolled upwardly upon itself to form a convoluted spongiform main body, said shank of said eye-member being disposed to penetrate through the fabric to depend centrally from the underside of said main body, said upper section being turned downwardly and around said main body to envelope the same, means for securing the free edge of said turned upper section to said main body, a handle stick, and said threaded shank of said eye member being screwed into the end of said handle stick to securely affix said mop head to the latter.

In testimony that I claim the invention set forth above I have hereunto set my hand this 16th day of June, 1923.

RUSSELL B. KINGMAN.

Witnesses:
 MARY C. MULVIHILL,
 M. G. HENDERSON.